United States Patent
Bianchini

(10) Patent No.: US 7,076,916 B2
(45) Date of Patent: Jul. 18, 2006

(54) INSECT AND NEST REMOVAL DEVICE

(76) Inventor: Steven A. Bianchini, 23492 Mirabella Cir. South, Boca Raton, FL (US) 33433

( * ) Notice: Subject to any disclaimer, the term of this patent is extended or adjusted under 35 U.S.C. 154(b) by 62 days.

(21) Appl. No.: 10/993,722

(22) Filed: Nov. 19, 2004

(65) Prior Publication Data

US 2005/0108922 A1    May 26, 2005

Related U.S. Application Data

(60) Provisional application No. 60/523,576, filed on Nov. 20, 2003.

(51) Int. Cl.
*A01M 3/00* (2006.01)
*A01M 7/00* (2006.01)

(52) U.S. Cl. .................. 43/132.1; 43/134; 43/900; 222/174

(58) Field of Classification Search ............ 43/132.1, 43/124, 900, 134; 222/174; 239/154; 56/329, 56/332, 333, 337, 339
See application file for complete search history.

(56) References Cited

U.S. PATENT DOCUMENTS

| | | | | |
|---|---|---|---|---|
| 83,178 A * | 10/1868 | Lang | ............................ | 56/337 |
| 205,214 A * | 6/1878 | Ruckel | ........................ | 56/333 |
| 207,988 A * | 9/1878 | Shelton | ........................ | 56/333 |
| 263,949 A * | 9/1882 | Overbey | ........................ | 56/337 |
| 353,304 A * | 11/1886 | Green | .......................... | 56/333 |
| 379,359 A * | 3/1888 | Bosch | ......................... | 222/174 |
| 406,744 A * | 7/1889 | Kriner | .......................... | 56/332 |
| 800,029 A * | 9/1905 | Terletzky | ..................... | 43/134 |
| 816,499 A * | 3/1906 | Pierce | ........................... | 43/134 |
| 1,166,735 A * | 1/1916 | Annis | .......................... | 56/339 |
| 1,173,868 A * | 2/1916 | Rose | ............................ | 56/339 |
| 1,181,595 A * | 5/1916 | Hively | ......................... | 56/332 |
| 1,194,260 A * | 8/1916 | White | .......................... | 56/333 |
| 1,212,225 A * | 1/1917 | Hunt | ............................ | 43/134 |
| 1,397,464 A * | 11/1921 | Sromovsky | ................... | 56/333 |
| 1,534,734 A * | 4/1925 | Porter | .......................... | 43/125 |
| 1,750,163 A * | 3/1930 | Disney | ......................... | 43/134 |
| 2,044,687 A * | 6/1936 | Hatten | ......................... | 239/154 |
| 2,591,716 A * | 4/1952 | Murphy | ....................... | 222/174 |
| 2,771,701 A * | 11/1956 | Harper et al. | .................. | 43/134 |
| 2,893,606 A * | 7/1959 | Hawkins | ...................... | 222/174 |
| 3,081,591 A * | 3/1963 | Coe | ............................. | 56/339 |

(Continued)

FOREIGN PATENT DOCUMENTS

DE    3235626 A1 *  3/1984  .................. 222/174

(Continued)

*Primary Examiner*—Darren W. Ark
(74) *Attorney, Agent, or Firm*—Robert M. Downey, PA

(57) ABSTRACT

A device for safely exterminating and removing insects and their nests includes a mesh basket supported on the distal end of a telescopically extendable pole. The basket is structured to partially collapse and includes a rubber gasket around an open top for sealed engagement against the surface surrounding the nest, thereby effectively containing the nest and capturing flying and crawling insects in the basket. A pressurized canister containing a chemical substance snaps into operable position on the pole, near the basket. A handle on the proximal end of the pole includes a trigger for actuating release of the chemical substance from the pressurized canister and towards the nest, thereby killing the captured insects. A blade supported within the basket enables removal of the nest from the surface after all of the insects have been exterminated. A splash shield removably attaches to the pole, below the basket, to protect the user from the chemical sprayed on the nest.

19 Claims, 1 Drawing Sheet

U.S. PATENT DOCUMENTS

| | | | |
|---|---|---|---|
| 3,140,800 A * | 7/1964 | Henderson | 222/174 |
| 3,229,859 A * | 1/1966 | Conroy et al. | 222/174 |
| 3,679,319 A * | 7/1972 | Munchel et al. | 222/174 |
| 3,856,209 A * | 12/1974 | Hickson | 222/174 |
| 4,089,440 A * | 5/1978 | Lee | 222/174 |
| 4,242,856 A * | 1/1981 | Patton | 56/339 |
| 4,413,756 A * | 11/1983 | Kirley | 43/132.1 |
| 4,546,563 A * | 10/1985 | Amburn | 43/132.1 |
| 4,624,070 A * | 11/1986 | Query et al. | 43/132.1 |
| 4,648,202 A * | 3/1987 | Renth | 43/132.1 |
| 4,789,084 A * | 12/1988 | Yoshitomi | 222/174 |
| 4,823,505 A * | 4/1989 | Jackson | 43/124 |
| 4,833,818 A * | 5/1989 | Berta | 43/132.1 |
| 4,839,985 A * | 6/1989 | Barry | 43/132.1 |
| 4,886,191 A * | 12/1989 | Yoshitomi | 222/174 |
| 4,928,461 A * | 5/1990 | King | 56/339 |
| 4,979,649 A * | 12/1990 | Wescott | 222/174 |
| 5,246,675 A * | 9/1993 | Castronovo | 43/900 |
| 5,307,959 A * | 5/1994 | Bedore et al. | 222/174 |
| 5,309,669 A * | 5/1994 | Jackson | 43/124 |
| 5,347,800 A * | 9/1994 | Morgan | 56/332 |
| 5,361,533 A * | 11/1994 | Pepper | 43/132.1 |
| 5,419,077 A * | 5/1995 | Tombarelli | 43/132.1 |
| 5,518,148 A * | 5/1996 | Smrt | 222/174 |
| 5,724,799 A * | 3/1998 | Hsia | 56/339 |
| 6,205,702 B1 * | 3/2001 | Ammons | 43/132.1 |
| 6,450,423 B1 * | 9/2002 | Gurule | 222/174 |
| 6,455,104 B1 * | 9/2002 | Kirwan | 222/174 |
| 6,581,326 B1 * | 6/2003 | Smith | 43/132.1 |
| 6,604,318 B1 * | 8/2003 | Cassidy | 43/132.1 |
| 6,637,151 B1 * | 10/2003 | Tillman | 43/900 |
| 6,663,307 B1 * | 12/2003 | Kopanic et al. | 222/174 |
| 6,688,036 B1 * | 2/2004 | Gunn | 43/132.1 |
| 6,695,172 B1 * | 2/2004 | Porter | 222/174 |
| 6,742,717 B1 * | 6/2004 | Aberegg et al. | 222/174 |
| 6,772,694 B1 * | 8/2004 | Pearce et al. | 43/132.1 |
| 6,840,004 B1 * | 1/2005 | Allen | 43/132.1 |
| 6,845,923 B1 * | 1/2005 | Slotsve | 222/174 |
| 6,925,751 B1 * | 8/2005 | Williams et al. | 43/132.1 |
| 6,925,791 B1 * | 8/2005 | Herndon | 56/333 |
| 6,966,461 B1 * | 11/2005 | Warner et al. | 222/174 |
| 2005/0199653 A1 * | 9/2005 | Warner et al. | 222/174 |
| 2005/0224517 A1 * | 10/2005 | Healy et al. | 222/174 |
| 2005/0279017 A1 * | 12/2005 | James et al. | 43/132.1 |
| 2005/0279767 A1 * | 12/2005 | Kenny et al. | 222/174 |

FOREIGN PATENT DOCUMENTS

| | | | | |
|---|---|---|---|---|
| DE | 3841172 A1 * | 6/1990 | | 222/174 |
| GB | 2198024 A * | 6/1988 | | 56/332 |
| GB | 2393893 A | 4/2004 | | |
| JP | 54-58215 A * | 5/1979 | | 239/332 |
| JP | 4-356149 A * | 12/1992 | | 43/124 |
| JP | 2000-4757 A * | 1/2000 | | |
| JP | 2003-250418 A * | 9/2003 | | |
| JP | 2004-222696 A * | 8/2004 | | |

* cited by examiner

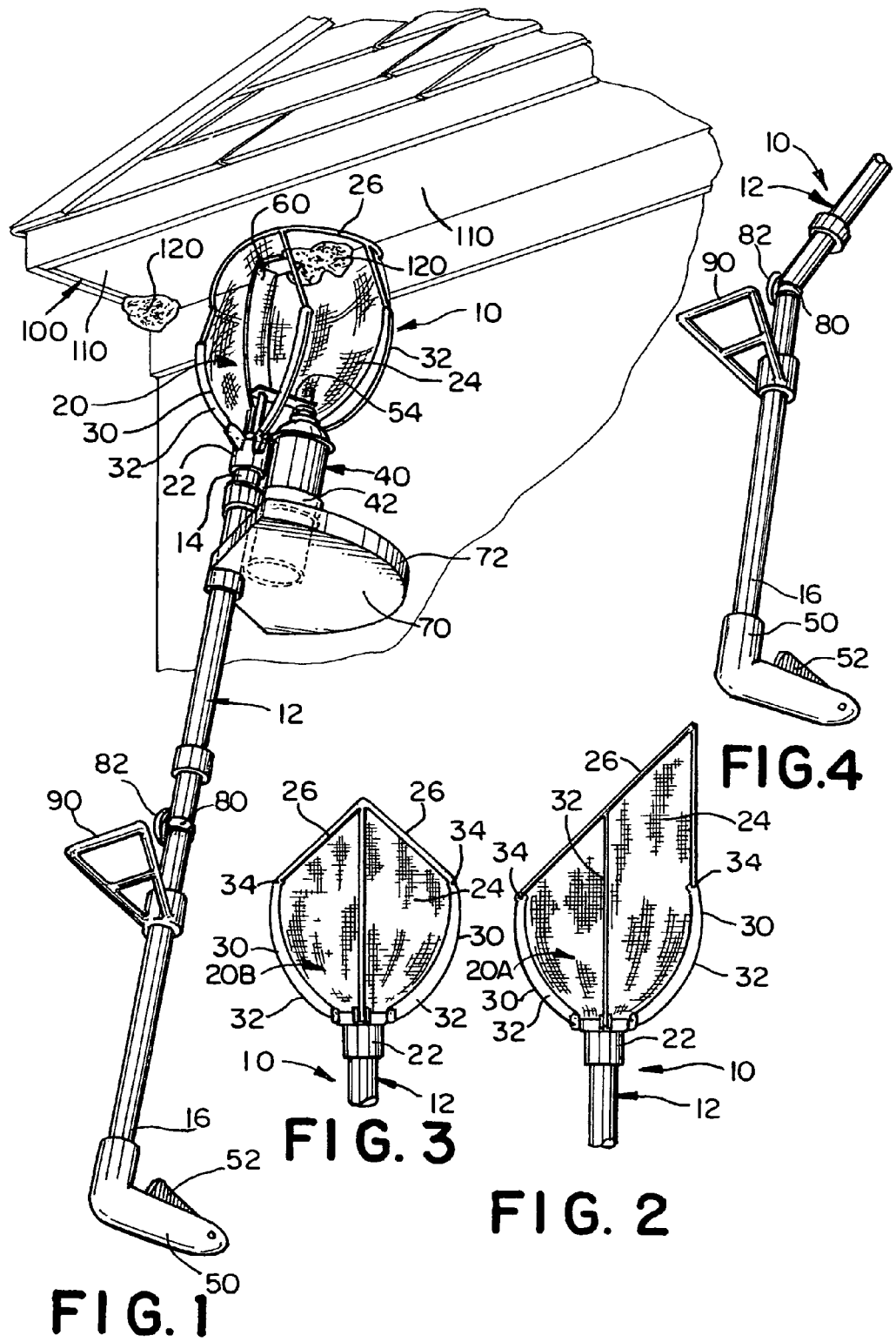

INSECT AND NEST REMOVAL DEVICE

This application claims the benefit of Provisional application Ser. No. 60/523,576, field Nov. 20, 2003.

BACKGROUND OF THE INVENTION

1. Field of the Invention

The present invention relates generally to insect control devices and, more particularly, to a device for safely exterminating and removing insects and their nests by containing the insects and nest within a basket, then spraying the nest and captured insects with a chemical, and, finally, removing the nest once all of the insects have been exterminated.

2. Discussion of the Related Art

Stinging insects such as wasps, hornets and bees can be a nuisance, particularly in densely populated areas. Often, these stinging insects build nests on the exterior of homes and building structures, in close proximity to humans. Due to the danger of being stung, particularly if allergic, most people find it unsettling to find wasp, hornet and bees nests on or near their home. Thus, it is desirable to remove these nests when near human habitats.

Presently, various insecticide products are available in pressurized canisters, such as aerosol cans, for spraying the insecticide on flying insects and nests. Some of these products are formulated and packaged to release the insecticide chemical in a directed stream, thereby allowing the user to spray a nest from a short distance. Presently, this is the most common method used by home owners to eradicate insect nests, and particularly wasp and hornet nests. However, this method has proven to be problematic for several reasons. First, almost immediately after hitting the nest with a stream of insecticide, the flying insects (e.g. wasps, hornets or bees) evacuate the nest and begin to fly around the vicinity of the nest, possibly attacking the person spraying the insecticide. A further problem is the exposure to the hazardous chemical insecticide released from the pressurized canister. Specifically, when spraying a stream of insecticide at a nest above a person's head, the liquid insecticide will quickly begin to drip down towards the person. And, because the person spraying the nest is ordinarily looking up to take aim at the nest, there is a danger of the dripping insecticide contacting the person's eyes or mouth. In any event, it is certainly undesirable to have any direct contact with a hazardous chemical substance, such as insecticides.

In the past, others have proposed alternative methods of insect control directed at incapacitating a nest of flying insects. Of particular relevance is the patent to Ammons, U.S. Pat. No. 6,205,702 B1, which discloses two different embodiments of an environmentally safe insect control system. A first embodiment uses a telescoping tube having a bowl-like structure on the top end and surrounding a nozzle for dispensing carbon dioxide onto and into the nest. A flexible tube extends from a bottom of the rigid telescoping tube and connects to a pressurized tank containing carbon dioxide. Actuation of a lever near the lower end of the telescoping tube releases carbon dioxide from the nozzle at the top end to kill the insects. A second embodiment in the Ammons patent uses a bag on the upper end of the telescoping tube with a drawstring for capturing the insects and nest during removal. A scraper is provided on the upper end for engaging the nest in order to remove the nest from the building structure. The various embodiments of the insect control system in Ammons present several significant drawbacks. Most notably, neither embodiment is structured to capture and contain the insects and nest prior to extermination. Specifically, the bowl-like structure and drawstring bag do not go over and surround the nest, nor are they structured to seal tightly against the building structure surrounding the nest. Thus, when the carbon dioxide is released, many insects will fly from the nest and escape. And, while the nest can eventually be removed, using the drawstring bag, there is always the danger of the user being stung by one or more flying insects which cannot be effectively contained. The Ammons system, using a tank strapped to the user's back is cumbersome and somewhat awkward, and is not practical for use by the typical homeowner.

The U.S. Patent to Porter, U.S. Pat. No. 1,534,734, discloses an insect and nest destroyer which provides a funnel shaped device on the end of an elongate pole. A flammable substance, such as kerosene oil, is used to cremate the insects captured in the funnel shaped device. This device is not generally safe and presents the danger of an accidental fire or damage to building structures and trees where insect nests are ordinarily found. Moreover, the Porter device is not generally suited for use by the typical homeowner.

The U.S. Patent to Smith, U.S. Pat. No. 6,581,826 B1 discloses a telescoping device employing a spray insecticide for use with elevated insect nests. This device fails to surround and contain the nest and flying insects prior to extermination. Accordingly, there is a very good chance that the user of this device may be stung by one or more flying insects which escape the nest.

In view of the shortcomings of the prior art, there remains an urgent need for an insect and nest removal device adapted for use by a typical homeowner and which effectively surrounds a nest in a sealed and contained enclosure while simultaneously enabling dispensing of an insecticide or other chemical substance from a pressurized canister to effectively exterminate the captured insects in and around the nest, thereby ensuring that all insects are killed prior to removal of the nest from a building structure or other surface.

SUMMARY OF THE INVENTION

The present invention is directed to a device for safely exterminating and removing insects and their nests from the exterior surfaces of houses, buildings, trees and other structures. The device includes a mesh basket supported on the distal end of a telescopically extendable pole. The basket is removable from the end of the pole and has a rubber gasket around an open top for sealed engagement against the surface surrounding the nest, thereby effectively containing the nest and capturing flying and crawling insects in the basket. A pressurized canister containing a chemical substance is attached to the pole, near the basket. A handle on the proximal end of the pole is provided with a trigger for actuating release of the chemical substance from the pressurized canister and towards the nest, thereby killing the captured insects. A blade supported within the basket enables removal of the nest from the surface after all of the insects have been exterminated. A splash shield removably attaches to the pole, below the basket, to protect the user from the chemical sprayed on the nest. The pole is adjustable in length and may include a fitting for angled adjustment as well. The basket has a flexible mesh or net material and is able to partially collapse, in a shock absorbing action, when the rubber gasket is pressed against the surface surrounding the nest for sealed engagement therewith.

OBJECTS AND ADVANTAGES OF THE INVENTION

With the foregoing in mind, it is primary object of the present invention to provide a device for safely and effectively exterminating and removing insects and their nests, and wherein the device is specifically structured to contain the insects and nest in a sealed netted basket enclosure and then kill all of the insects in and around the nest by dispensing an insecticide or other chemical substance from a pressurized canister.

It is a further object of the present invention to provide a device for safely and effectively exterminating and removing insects and their nests, and wherein the device includes a netted basket removably attached to the end of an elongate telescoping pole, and wherein the netted basket is adapted to seal around the nest prior to releasing an insecticide or other chemical substance from a pressurized canister by actuation of a trigger mechanism on the lower opposite end of the telescoping pole.

It is a further object of the present invention to provide an insect and nest removal device which is adapted for use by men and women of all sizes and strengths.

It is a further object of the present invention to provide an insect and nest removal device, as set forth above, and wherein the length and angle of the telescoping pole are selectively adjustable.

It is still a further object of the present invention to provide an insect and nest removal device, as set forth above, and wherein the device further includes a removable splash shield to protect the user from contact with the chemical released from the pressurized canister.

It is still a further object of the present invention to provide and insect and nest removal device, as set forth above, and wherein the netted basket includes a shock absorbing structure which allows the basket to partially collapse upon forcing the open end of the basket in sealed engagement against a surface surrounding the nest.

It is still a further object of the present invention to provide an insect and nest removal device, as set forth above, and wherein a plurality of different baskets are provided to accommodate variations in angle and contour of surfaces where insect nests attach to building structures and the like.

It is yet a further object of the present invention to provide an insect and nest removal device, as set forth above, and wherein the device further includes a blade or like attachment fitting for effectively removing the nest from the surface of a building structure or other like surface after all of the insects in the nest have been exterminated.

It is yet a further object of the present invention to provide an insect and nest removal device as set forth above, which is simple and safe to use by the typical home owner.

These and other objects and advantages of the present invention are more readily apparent with reference to the following detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which:

FIG. 1 is a perspective view of the insect and nest removal device of the present invention shown in use to eradicate insects and their nests attached to a building structure;

FIG. 2 is a isolated side elevation of an alternative embodiment of the basket of the device;

FIG. 3 is an isolated side elevational view of yet a further embodiment of the basket of the device; and FIG. 4 is an isolated perspective view showing a lower half of the device to illustrate angled adjustment of the telescoping pole.

Like reference numerals refer to like parts throughout the several views of the drawings.

DETAILED DESCRIPTION OF THE PREFERRED EMBODIMENTS

Referring to the several views of the drawings, and initially FIG. 1, the insect and nest removal device of the present invention is shown and is generally indicated as 10. The device 10 includes an elongate telescoping pole 12 with an upper distal end portion 14 and a lower proximal end portion 16. A basket 20 removably attaches to the distal end portion 14. In the preferred embodiment, the basket 20 is adapted for screw attachment to the distal end portion 14, such as with the use of a collar 22 having internal threads adapted for mating threaded attachment to threads on the distal end portion 14 of the pole 12. The collar 22 or other like fitting may further include a ball and socket type joint which, when loosened, allows the basket to swivel for angled adjustment relative to the pole. Once positioned at the desired angle, the ball and socket joint can be tightened to fix the basket in the adjusted position.

The basket 20 is formed primarily of a mesh material 24 which is preferably flexible and non-corrosive. In a preferred embodiment, the mesh material 24 of the basket is of a metal composition similar in nature to window screening. Alternatively, the mesh or netting material 24 may be of a nylon or fiberglass material, similar to that used in the manufacture of swimming pool skimmer nets and leaf nets. The basket 20 is open at the top end and is surrounded by a rubber or like material gasket 26. The gasket 26 is specifically structured for sealed engagement against the surface 110 surrounding an insect nest 120 (e.g. wasp or hornet nest) attached to the exterior of a building structure 100. In a preferred embodiment, the basket 20 is specifically structured to partially collapse when the gasket 26 is pressed against the surface 110 in order to encourage a tight seal. To achieve this desired feature, the basket may be provided with a frame structure 30 having a plurality of brace members 32 at spaced intervals about the sides of the basket such that the mesh material 24 both extends between and is positioned within the plurality of brace members 32. The brace members 32 are specifically structured to flex, in a shock absorbing action, when a force is exerted on the gasket 26. For instance, the brace members 32 may be provided with flex joints 34 which are adapted to flex in a shock absorbing action, allowing the basket, including the mesh material 24, to partially collapse as the gasket seal 26 is pressed firmly against the surface 110 surrounding the nest 120. In this manner, an effective seal is maintained to prevent escape of flying insects which leave the nest 120 during the extermination process.

A canister 40 containing a pressurized chemical composition, such as a pesticide or insecticide, is attached to the pole 12 at or near the upper distal end portion 14. Attachment of the canister 40 to the pole is achieved with the use of snap fittings which are provided as part of the manufactured device 10. The snap fittings 42 are structured to snap the canister into fixed operable position on the pole by engaging the canister on opposite sides of a circumference of the canister A top nozzle on the pressurized canister 40 is specifically structured to release the pressurized chemical contents upwardly through the mesh material 24 of the basket 20 and within the contained area on the inside of the basket, including the nest 120. In this manner, with the rubber gasket seal 26 maintained in sealed engagement around the nest 120, insects within the nest 120 and flying and/or crawling around the area surrounding the nest 120 are captured within the basket 20 for exposure to the chemical substance released from the canister 40.

A handle 50 on the proximal end portion 16 of the pole 12 is provided with a trigger 52. The trigger 52 is linked to an actuator mechanism 54 at the top distal end of the pole. Operation of the trigger 52, by squeezing, serves to operate the actuator mechanism 54 which, in turn, actuates release of the pressurized chemical contents from the canister 40. In a preferred embodiment, the actuator mechanism 54 is specifically structured to operate the nozzle and valve fitting on the top of pressurized canister 40 so that, when the trigger 52 is squeezed, the actuator mechanism 54 operates the nozzle and valve mechanism to release the pressurized chemical contents from the canister 40 upwardly towards the nest 120.

The upper distal end portion 14 of the pole 12 is further fitted with a blade or other like attachment device 60 for scraping and/or cutting the nest 120 from the surface 110 of the building structure 100. In this manner, once all of the insects in and around the nest 120 have been completely killed, the blade fitting 60 is used to scrape or cut the nest 120 free and into the basket 20 for subsequent disposal. The blade fitting 60 is removable for cleaning and replacement.

A splash shield 70 removably attaches to the elongate pole 12, preferably just below the pressurized canister 40. The splash shield may include an upstanding lip 72 surrounding the periphery of the top surface for capturing the liquid chemical substance which drips down from the basket 20, nest 120 and surface 110, thereby protecting the user standing below the shield 70. In a preferred embodiment, the splash shield 70 is specifically structured to provide protection while also enabling line of sight viewing of the nest 120 and surface 110 for properly positioning the basket 20 over the nest 120.

In addition to telescopic adjustment of the overall length of the pole 12, an angle adjustment feature is provided. Specifically, an angle adjustment mechanism 80 is provided on the pole 12, preferably along a lower extension, and includes a knob or like fitting for tightening and loosening the angle adjustment mechanism 80. By rotating the knob in one direction, the angle adjustment mechanism can loosened to permit angled, adjusted movement of the upper portion of the pole relative to a lower portion of the pole 12. When positioned at the desired angle, the knob can be tightened to secure the upper portion of the pole in fixed, angled position relative to the lower portion of the pole, as seen in FIG. 4.

FIGS. 2 and 3 illustrate various examples of additional basket attachments which may be used for various surface angle configurations of the building structure. Specifically, FIG. 2 illustrates a basket 20A having an angled open top for sealed engagement with an angled overhanging structure such as a soffit on a building structure. FIG. 3 illustrates yet a further example of a basket 20B having an open top and surrounding rubber gasket 26 which is angled specifically for sealed engagement with a corner exterior surface of a building structure, such as the juncture between horizontally extending soffit and vertical wall surface.

A second handle support 90 may be provided on the lower portion of the elongate pole 12 to assist with alignment, positioning and stabilizing of the basket 20 in sealed engagement with the surface 110 surrounding the nest while simultaneously operating the trigger 52 with the other hand to release the chemical substance from the canister 40.

While present invention has been shown and described in accordance with various preferred embodiments, it is recognized that departures from the instant disclosure are contemplated within the spirit and scope of the present invention.

What is claimed is:

1. A device for exterminating insects with a chemical substance released from a pressurized canister and, further, for removing the insects and insect nests from a structure to which the nests are attached; said device comprising:
    an elongate pole having a distal end portion and an opposite proximal end portion;
    a basket secured to said distal end portion, said basket including sides formed of a mesh material and surrounding an interior basket chamber, an open top surrounded by a rim with a rubber seal for sealed engagement with a surface of the structure surrounding the insect nest, a frame structure which includes a plurality of brace members extending between said distal end portion of said pole and said rim, and wherein said mesh material both extends between and is positioned within said plurality of brace members;
    at least one canister holder fitting on said distal end portion of said pole for releasably holding the pressurized canister in a position which causes the chemical substance to be directed into said interior chamber of said basket and towards said open to of said basket when the chemical substance is released from the pressurized canister, and said at least one canister holder fitting both extending transversely from said pole at a location below said basket and which holds the pressurized canister by engaging opposite sides of a circumference of the canister;
    an actuator mechanism operable to release the chemical substance from the pressurized canister; and
    a trigger mechanism at said proximal end portion of said pole for operating said actuator mechanism to selectively release the chemical substance from the pressurized canister.

2. The device as recited in claim 1 wherein said sides of said basket are partially collapsible upon forced engagement of said rim against the surface of the structure.

3. The device as recited in claim 1 wherein said mesh material and said frame structure are adapted to yield and partially collapse in response to a force exerted on said rim towards said distal end portion of said pole.

4. The device as recited in claim 3 wherein said brace members include flex joints for allowing said frame structure to partially collapse upon exertion of the force on said rim.

5. The device as recited in claim 1 further including a blade member within said basket for scraping and removing the insect nests from the surface of the structure.

6. The device as recited in claim 5 wherein said blade member is structured and disposed to cause the insect nests to fall into said interior basket chamber of said basket upon removal of said insect nests from the structure.

7. The device as recited in claim 1 wherein said elongate pole is adjustable in overall length to selectively change a distance between said proximal end portion and said distal end portion throughout a range of selected, adjusted positions.

8. The device as recited in claim 1 wherein said elongate pole is angularly adjustable for selectively adjusting an angular position of said distal end portion and said basket relative to said proximal end portion throughout a range of adjusted, angled positions.

9. The device as recited in claim 1 further comprising a shield fitted to said pole between said at least one canister holder fitting and said proximal end portion for catching a liquid chemical substance which drips downwardly towards the proximal end portion.

10. The device as recited in claim 1 further comprising a handle on said proximal end portion and including said trigger mechanism.

11. The device as recited in claim 10 further comprising a second handle on said elongate pole between said proximal end portion and said distal end portion.

12. A device for exterminating insects with a chemical substance released from a pressurized canister and, further, for removing the insects and insect nests from a structure to which the nests are attached; said device comprising:
 an elongate pole having a distal end portion and an opposite proximal end portion;
 a basket secured to said distal end portion, said basket including sides formed of a mesh material and surrounding an interior basket chamber, an open top surrounded by a rim with a rubber seal for sealed engagement with a surface of the structure surrounding the insect nest, a frame structure which includes a plurality of brace members extending between said distal end portion of said pole and said rim, and wherein said mesh material both extends between and is positioned within said plurality of brace members;
 at least one canister holder fitting on said distal end portion of said pole for releasably holding the pressurized canister in a position which causes the chemical substance to be directed into said interior chamber of said basket towards said open top of said basket when the chemical substance is released from the pressurized canister, and said at least one canister holder fitting both extending transversely from said pole at a location below said basket and which holds the pressurized canister by engaging opposite sides of a circumference of the canister;
 an actuator mechanism operable to release the chemical substance from the pressurized canister;
 a trigger mechanism at said proximal end portion of said pole for operating said actuator mechanism to selectively release the chemical substance from the pressurized canister; and
 a blade member within said basket for scraping and removing the insect nests from the surface of the structure, and said blade member being structured and disposed to cause the insect nests to fall into said interior basket chamber of said basket upon removal of said insect nests from the structure.

13. The device as recited in claim 12 wherein said sides of said basket are partially collapsible upon forced engagement of said rim against the surface of the structure.

14. The device as recited in claim 12 wherein said elongate pole is adjustable in overall length to selectively change a distance between said proximal end portion and said distal end portion throughout a range of selected, adjusted positions.

15. The device as recited in claim 12 wherein said elongate pole is angularly adjustable for selectively adjusting an angular position of said distal end portion and said basket relative to said proximal end portion throughout a range of adjusted, angled positions.

16. A device for exterminating insects with a chemical substance released from a pressurized canister and, further, for removing the insects and insect nests from a structure to which the nests are attached; said device comprising:
 an elongate pole having a distal end portion and an opposite proximal end portion;
 a basket secured to said distal end portion, said basket including sides formed of a mesh material and surrounding an interior basket chamber, an open top surrounded by a rim with a rubber seal for sealed engagement with a surface of the structure surrounding the insect nest, said sides of said basket being partially collapsible upon forced engagement of said rim against the surface of the structure, a frame structure which includes a plurality of brace members extending between said distal end portion of said pole and said rim, and wherein said mesh material both extends between and is positioned within said plurality of brace members;
 at least one canister holder filling on said distal end portion of said pole for releasably holding the pressurized canister in a position which causes the chemical substance to be directed into said interior chamber of said basket and towards said open top of said basket when the chemical substance is released from the pressurized canister, and said at least one canister holder fitting both extending transversely from said cole at a location below said basket and which holds the pressurized canister by engaging opposite sides of a circumference of the canister;
 an actuator mechanism operable to release the chemical substance from the pressurized canister; and
 a trigger mechanism at said proximal end portion of said pole for operating said actuator mechanism to selectively release the chemical substance from the pressurized canister.

17. The device as recited in claim 16 wherein said mesh material and said frame structure are adapted to yield and partially collapse in response to a force exerted on said rim towards said distal end portion of said pole.

18. The device as recited in claim 17 wherein said plurality of brace members includes flex joints for allowing said frame structure to partially collapse upon exertion of the force on said rim.

19. The device as recited in claim 16 further comprising a handle on said proximal end portion and including said trigger mechanism.

* * * * *